United States Patent [19]
Wixey et al.

[11] Patent Number: 5,542,639
[45] Date of Patent: Aug. 6, 1996

[54] FLAT FOLDING SUPPORT

[75] Inventors: Barry D. Wixey, Pittsburgh; Ronald E. Young, Cheswick; Charles J. Baird, Pittsburgh; Jeffrey L. Haffely, Gibsonia, all of Pa.

[73] Assignee: Delta International Machinery Corp., Pittsburgh, Pa.

[21] Appl. No.: 255,419

[22] Filed: Jun. 8, 1994

[51] Int. Cl.$^6$ .................................................. F16M 11/32
[52] U.S. Cl. ........................... 248/439; 108/117; 108/132; 248/440; 248/440.1; 248/188.91
[58] Field of Search ...................... 248/166, 170, 248/172, 173, 432, 434, 439, 440, 440.1; 108/44, 124, 117, 127, 12, 128, 129, 132, 65, 78; 403/32, 231, 233, 236, 245

[56] References Cited

U.S. PATENT DOCUMENTS

| | | | |
|---|---|---|---|
| 896,907 | 8/1908 | Haskell | 108/127 |
| 1,774,268 | 8/1930 | Harding | 108/65 |
| 2,888,305 | 5/1959 | Perry | 108/65 |
| 4,191,111 | 3/1980 | Emmert | 108/132 |
| 4,341,164 | 7/1982 | Johnson | 108/67 |
| 4,601,226 | 7/1986 | McClintock | 83/415 |
| 4,708,309 | 11/1987 | Walter | 248/218.4 |
| 4,768,620 | 9/1988 | South | 108/65 X |
| 5,119,903 | 6/1992 | Ulshafer, Jr. | 248/439 X |
| 5,284,100 | 2/1994 | Thorn | 108/129 |

FOREIGN PATENT DOCUMENTS 8908011  9/1989  WIPO ................................ 108/129

*Primary Examiner*—Alvin C. Chin-Shue
*Assistant Examiner*—Derek J. Berger
*Attorney, Agent, or Firm*—Kirkpatrick & Lockhart LLP

[57] ABSTRACT

Apparatus for supporting an object which includes at least two leg members attached to and capable of folding under an object-supporting surface. The leg members are pivotally attached to the object-supporting surface at pivot axes offset from one another relative to the object-supporting surface so that the leg members may fold under the object-supporting surface without interfering with one another. The apparatus includes diagonal supports, attached from the leg members to the object-supporting surface, which are designed to fold with the leg members. The apparatus may also include side rails defining the object-supporting surface. The side rails are configured to releasably attach to a specially configured base portion on an object such as a miter saw.

14 Claims, 10 Drawing Sheets

5,542,639

FLAT FOLDING SUPPORT

BACKGROUND OF THE INVENTION

1. Field of the Invention

The present invention relates to collapsible stands, frames, or supports which fold substantially flat when in the collapsed configuration. The present invention particularly relates to flat-folding, collapsible stands, frames, or supports which receive and retain thereon an object having a specially configured base portion. The present invention more particularly relates to a portable miter saw having a specially configured base portion and a flat-folding, collapsible stand configured to removably receive the base portion.

2. Description of the Invention Background

A number of stands or frames have been designed to raise a work piece or a machine to a desired height. By raising an object above the ground, the object may be worked on or used safely and comfortably. An example of such a stand or frame is depicted in United States Design Patent Application No. 29/002,744. That design may be used to support a work piece above the ground or may be adapted to removably mount a machine.

It is also desirable that an elevating stand or frame be transportable. For example, carpenters building a structure at a remote job site desire a work stand or machine support which may be easily transported to and from the site while occupying a minimum of space in transit. Therefore, many stands or supports have leg members which are moveable between a first position, wherein the leg members extend and the object is raised above the ground, and a second position, wherein the leg members are disposed such that the stand or support occupies a smaller space. However, many of these stands or supports are unusable in the second position because they will not lie flat on a surface.

In addition, because stands or supports are commonly constructed of lightweight materials and/or may be used to support relatively heavy loads, it is known to use some type of support members to reinforce the legs of the stand or support to prevent the stand or support from wobbling or collapsing. When such reinforcing or support members are included on the stand or support, the design may become somewhat complex and a number of steps may be required to change the orientation of the stand or support between the first and the second positions.

Considering the above, one object of the present invention is to provide a work stand or machine support which is collapsible from an unfolded configuration, in which the legs extend from the stand, to a folded configuration, in which the legs are disposed closer to the supported object. A second object of the present invention is to provide a work stand or machine support which lies substantially flat when in the folded configuration. An additional object is to provide a stand or support which includes support members to reinforce the legs, the support members being designed so that changing the stand or support between the folded and the unfolded positions may be accomplished with a minimum number of steps.

SUMMARY OF THE INVENTION

It will be evident from the following description that the stand or support of the present invention is capable of various applications, for example, as a support stand or frame for a portable power tool. However, for the sake of simplicity it will hereafter be generally referred to as a stand.

To address the above-stated objectives, the present invention provides for a collapsible stand which includes a portion for supporting an object and which further includes first and second leg members which are pivotally connected to opposed ends of the object supporting portion. The leg members may pivot between a folded position, wherein the leg members are substantially parallel to the object-supporting portion, and an unfolded position, wherein the leg members extend outwardly from the object-supporting portion. In the folded position, the first leg member is intermediate the object-supporting portion and the second leg member, and the stand or support lies substantially flat.

The stand may further include diagonal support members which stabilize the leg members in the unfolded position. The diagonal support members are configured so that they may fold along with the leg members when the stand is in the folded position. The stand may also include specially configured post members by which the leg members are pivotally attached to the object-supporting portion of the stand. The stand may rest on the post members when the leg members are in the folded position.

These and other features and advantages of the stand of the present invention will be apparent from the following detailed description of the invention.

DETAILED DESCRIPTION OF THE INVENTION

Figure 1:
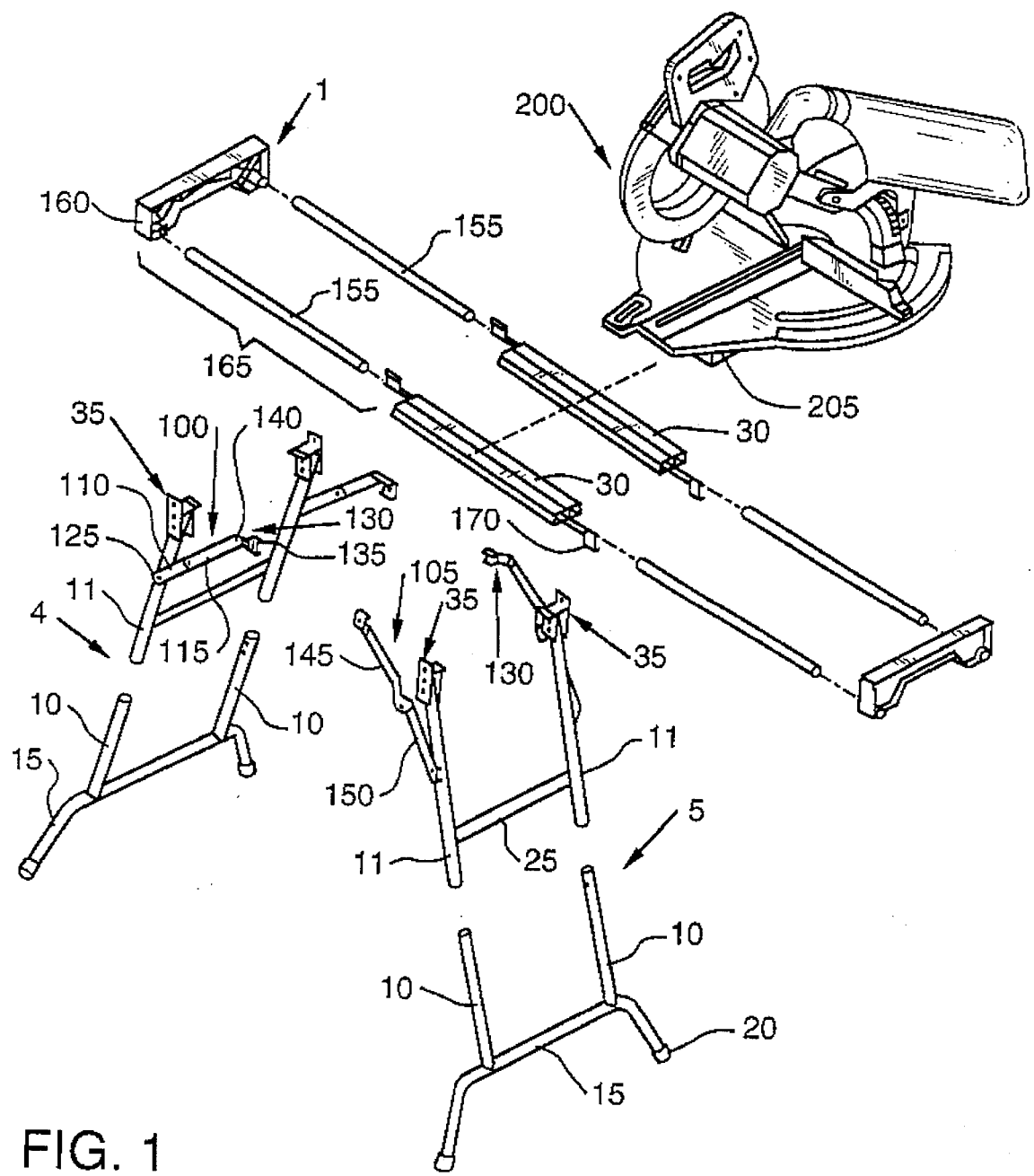
FIG. 1 is an exploded view of the preferred embodiment of the stand of the present invention showing the relationship of the components thereof and including a miter saw having a base adapted to be supported by the present invention.
Figure 2:
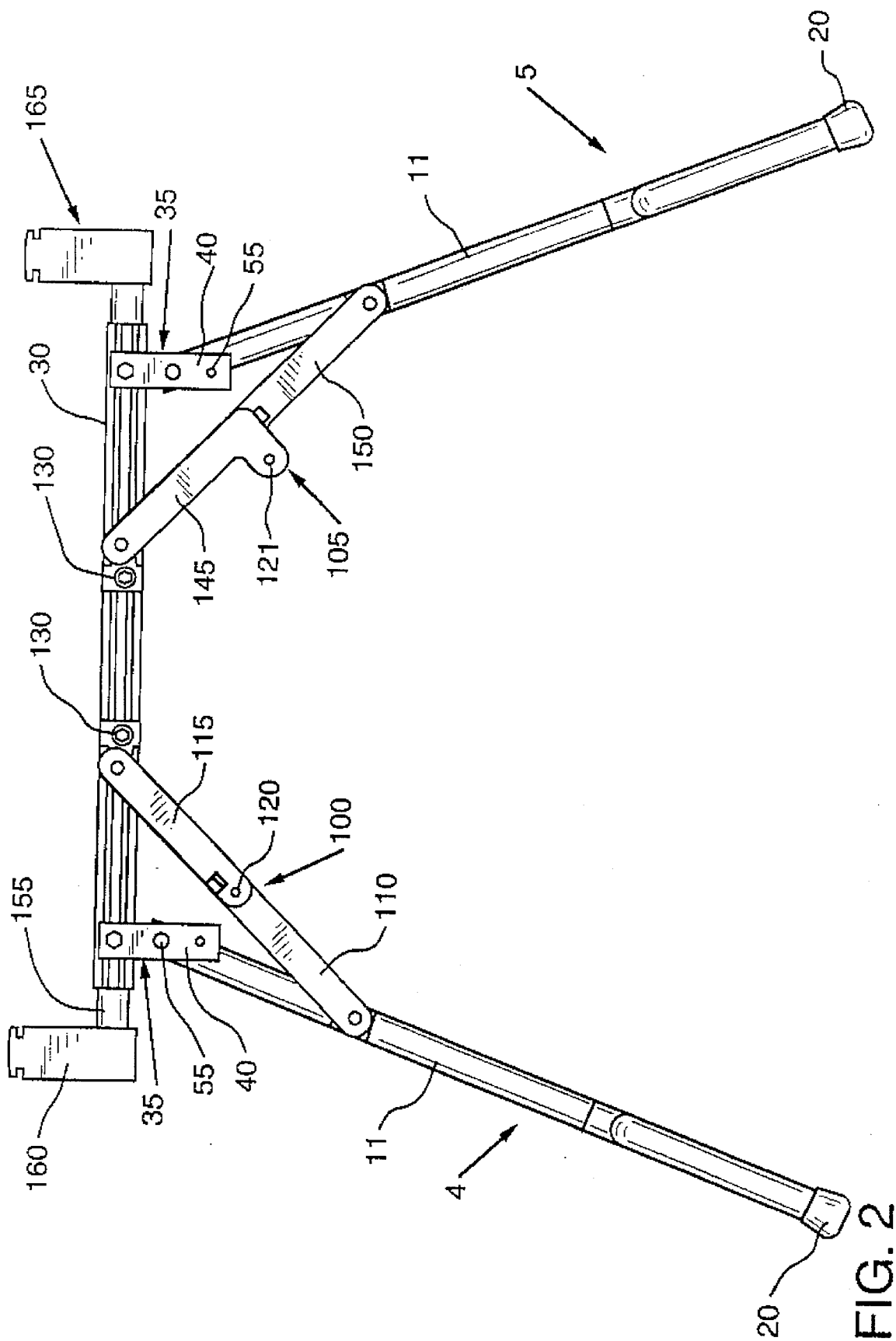
FIG. 2 is an elevational view of the preferred embodiment of the stand of the present invention with the moveable components thereof in the unfolded configuration.

In general, the invention is directed to a stand including an object-supporting portion and leg members to maintain the object-supporting portion at a desired distance above the ground. As shown in FIGS. 1 and 2, the preferred configuration of the stand 1 of the present invention includes first and second leg members 4 and 5, respectively. In the preferred configuration shown in FIG. 1, each leg member 4 and 5 includes two first straight leg supports 10, two second straight leg supports 11, and a generally U-shaped foot member 15 having a substantially straight horizontal portion rounding at the ends in foot portions which contact the surface on which the stand is placed.

First and second straight leg supports 10 and 11, respectively, are preferably tubular and are sized so that first straight leg supports 10 may slide within second straight leg support 11 and may be fixedly disposed within the second straight leg support 11 to adjust the length of the first and second leg members 4 and 5. In this way, the stand may be raised to various heights or may be adjusted to account for uneven ground. The terminal ends of the foot members 15 may include foot pads 20 composed of a material which will prevent slippage of foot members 15 and will protect surfaces from being marked by the ends of foot members 15.

Each first straight leg support 10 is fixedly attached at a first end to a foot member 15 near the rounded ends of the foot member 15 such that the two components lie in a single plane, the two first straight leg supports 10 of each leg member 4 and 5 being disposed substantially parallel to each other. A horizontal reinforcing member 25 spans the distance between the second straight leg supports 11 of each leg member. The horizontal reinforcing member 25 strengthens the leg members 4 and 5, inhibits rocking movement of the stand, and prevents the leg members 4 and 5 from collapsing. In the preferred embodiment of the stand, shown in FIG. 1, one end of each second straight leg support 11 is pivotally connected by posts 35 to side rails 30. The side rails 30 comprise the object-supporting portion of the stand.

Although the preferred embodiment of the present invention includes first and second leg members 4 and 5 which include the above-described elements, other leg designs of equivalent utility are contemplated. For example, instead of the two leg members described above, the stand could include three or four individual leg members, each leg member pivotable with respect to side rails 30.

In the preferred embodiment shown in FIG. 1, side rails 30 are configured to releasably connect to the specially designed base portion 205 of a sliding compound miter saw which is the subject of a co-pending application filed on even date herewith and entitled "Adjustable Tool Station". However, it will be understood that any machine or other object may be designed to mount on the preferred embodiment of the stand using the arrangement of elements described herein. In addition, consideration of other features of the invention will make apparent the exceedingly wide applicability of those features.

Although in the preferred embodiment the leg members 4 and 5 are pivotally connected to side rails 30, it is contemplated that the construction of the object-supporting portion, to which leg members 4 and 5 are connected, may be varied to suit the intended use of the stand. For example, if the stand is to function as a portable work table or work support stand, leg members 4 and 5 may be directly or indirectly connected to either a substantially planar surface or a surface specially configured to support a certain material, rather than to side rails 30. If, as in the preferred embodiment shown in the accompanying Figures, the stand is to be used as a framework to support, for example, powered machinery, the stand's components may be configured to releasably connect to a portion of the powered machinery and support the machinery at a suitable elevation.

Figure 4:
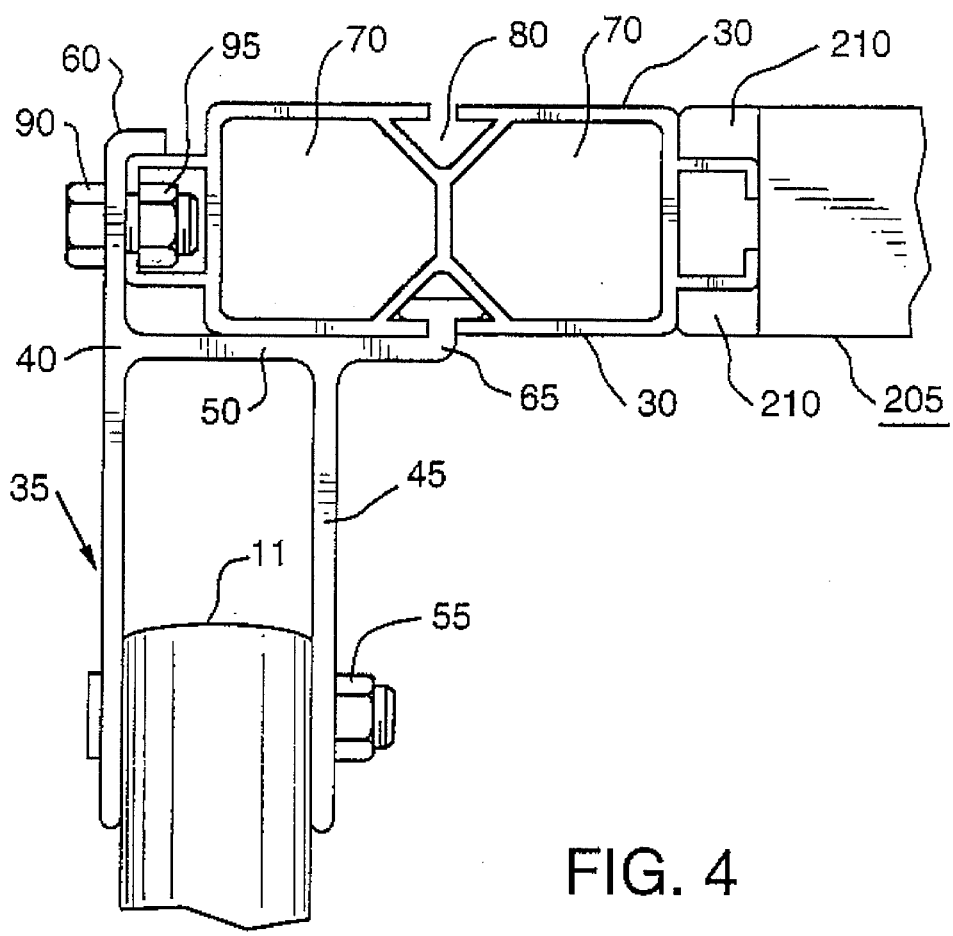
FIG. 4 is an on-end profile of an extruded side rail, post, second straight leg support, and base portion of the preferred embodiment of the present invention showing the relationship between those parts.

FIG. 4 depicts the on-end profile of a side rail 30 of the preferred embodiment of the present invention looking in the direction of the longitudinal axis of side rail 30 and posts 35. Each side rail 30 includes two continuous six-sided chambers 70 connected at a common side and open throughout their longitudinal length. A continuous first channel 75 is provided on the external surface of each continuous chamber 70 opposite the common side. As shown in FIG. 4, the continuous first channels 75 are open along their longitudinal length and include a continuous open slot. The first channels 75 define first and second side surfaces of the side rail 30. A continuous substantially V-shaped second channel 80 is disposed on the top and bottom surfaces of side rail 30. The second channels 80 are defined by one side surface of each chamber 70 and by a lip extending therefrom.

Each half of side rail 30 is a mirror image of the opposite half. As such, the side rails 30 of stand 1 have no identifiable top or bottom surface and no identifiable front or back surface and are interchangeable one with another. Because chambers 70 and first and second channels 75 and 80, respectively, are continuous and open along their longitudinal length, they may be easily and economically manufactured by an extrusion process.

Figure 5:
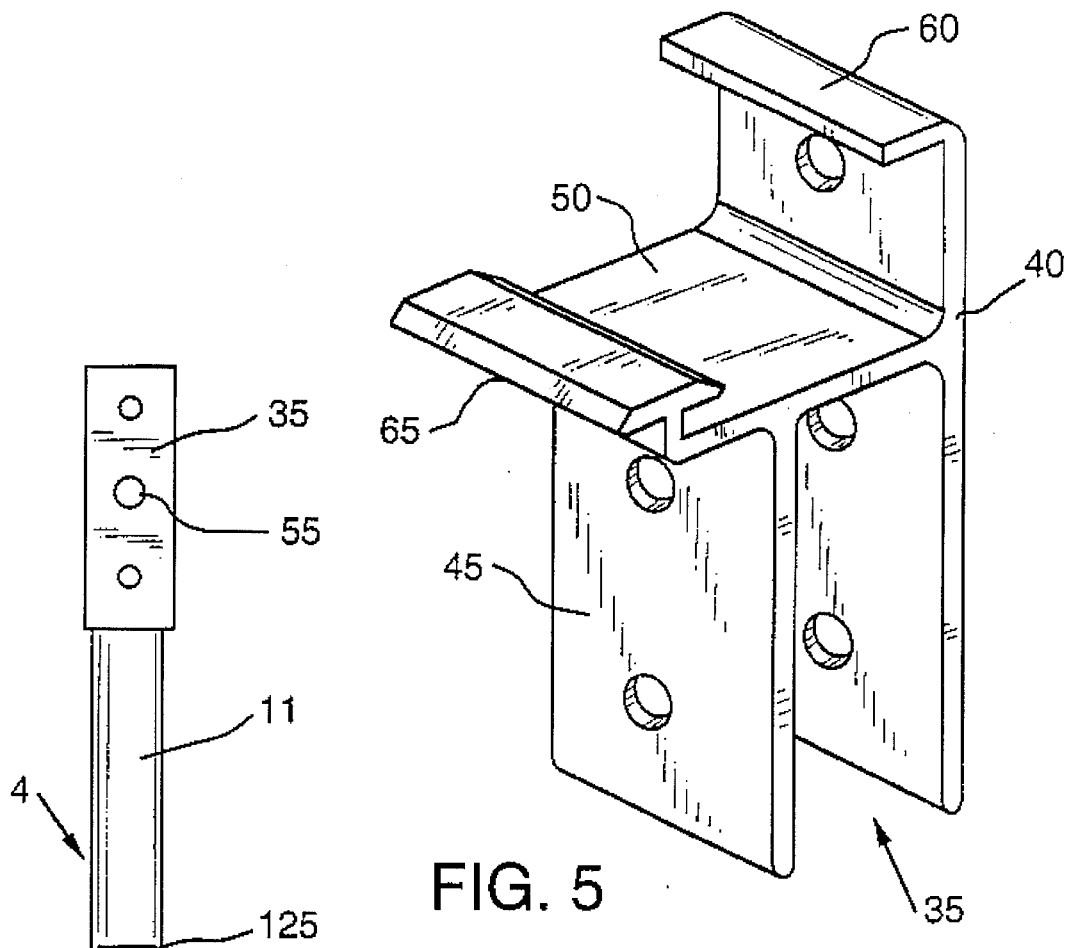
FIG. 5 is a perspective view of a post of the preferred embodiment of the present invention.

As further shown in FIG. 1, the stand of the present invention includes four posts 35, one post 35 for attaching each of the second straight leg supports 11 of each leg member 4 and 5 to a side rail 30. The preferred configuration of each post 35, shown in FIG. 5, is identical and includes a first coupling plate 40 which is a generally rectangular plate having three bores therethrough and an attachment portion 60 which is a hooked end. As shown in FIG. 4, the on-end profile of the first coupling plate 40 resembles an attenuated J. Posts 35 further include a second coupling plate 45 fixedly connected to the first coupling plate 40 by weight-bearing member 50 such that the flat surfaces of the first and second coupling plates 40 and 45 are substantially parallel. The second coupling plate 45 is shortened relative to the first coupling plate 40 and includes two bores therethrough. Weight-bearing member 50 is a substantially rectangular, flat plate and is fixedly attached at a first end to the first coupling plate 40 such that the plane of weight-bearing member 50 is substantially perpendicular to the plane of the first coupling plate 40. A second end of the weight-bearing member 50 is fixedly connected to the second coupling plate 45 such that the weight-bearing member 50 extends beyond the plane of the second coupling plate 45 and ends in an upturned, T-shaped flange 65. The first and second coupling plates 40 and 45 are disposed such that the two bores in the second coupling plate 45 align with the lower two bores in the first coupling plate 40.

As with the side rails 30, the profile of each post 35 is identical and the posts 35 are interchangeable. The shape of the posts 35 allows for their economical manufacture in substantially finished form by an extrusion process.

As shown in FIGS. 1, 2 and 4, an end of each second straight leg support 11 of each leg member 4 and 5 includes a bore therethrough which is aligned with bores in the first and second coupling plates 40 and 45 of post 35. Fastening member 55 is disposed through the aligned bores and retains the leg member on post 35 such that the leg member may pivot about the fastening member 55. As best shown in FIG. 2, in connecting the leg members 4 and 5 of the preferred configuration to the posts 35, the second straight leg supports 11 are attached to the posts 35 so that each leg member pivots on a different axis along the longitudinal axis of the first coupling plate 40. That is accomplished as follows.

The two second straight leg supports 11 of leg member 4 are fastened to posts 35 using the middle bore in the first coupling plate 40 and the aligned top bore in the second coupling plate 45. The two second straight leg supports 11 on the remaining leg member 4 are fastened to the posts 35 using the bottom-most bore in the first and second coupling plates 40 and 45. In that manner, the posts and fastening members provide a means for pivotally connecting leg members 4 and 5 to the object-supporting portion.

The first and second leg members 4 and 5 are attached to the side rails 30 by posts 35 as follows. As shown in FIG. 4, in connecting post 35 to side rail 30, a second threaded fastening member 90 is disposed through the top bore in first coupling plate 40 and is loosely threadedly retained therein by nut 95. To connect post 35 to side rail 30, nut 95 is introduced into open track 75 and the upturned, T-shaped flange 65 of weight-bearing member 50 is simultaneously introduced into V-shaped recess 80. It will be understood from consideration of the above, and from FIGS. 2 and 4, that the post 35 may thereby slide along both the open track 75 and the V-shaped recess 80 so as to position the post 35 at the desired location along the length of the side rail 30. The post 35, and the leg members 4 and 5 attached thereto, may be fastened at the desired point along the side rail 30 by tightening second fastening member 90 so as to force nut 95, which has a diameter greater than the opening in open track 75, against the inner surface of the open track 75.

Figure 3:
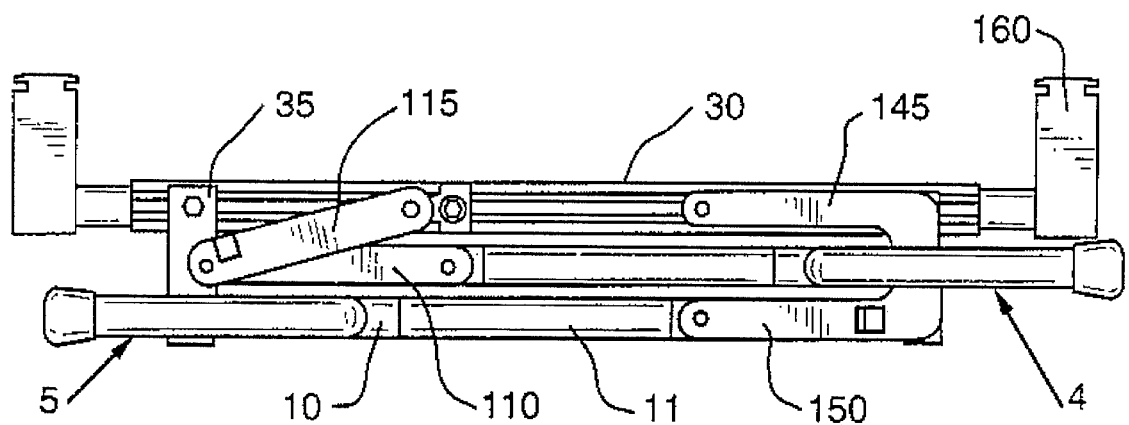
FIG. 3 is an elevational view of the preferred embodiment of the stand of the present invention with the moveable components thereof in the folded configuration.

The aligned bores in the coupling plates 40 and 45 are disposed such that when the leg members 4 and 5 are pivoted from the unfolded position shown in FIG. 2 to the folded position shown in FIG. 3, the stand rests on the bottom edges of the first and second coupling plates 40 and 45 of each post 35. Also, when in the folded position, the first leg member 4, which pivots at the middle-positioned bore in the first coupling plate 40 and the upper bore in the second coupling plate 45, pivots so as to be substantially flush, i.e., horizontal and adjacent with, the bottom surface of the side rails 30. The bottom-most bores in the first and second coupling plates 40 and 45 are disposed so that the remaining leg member 5 will pivot so as to be substantially flush with leg member 4, without interfering with leg member 4, while allowing the stand to rest flat on the bottom edges of the posts 35. It will be understood that the offset pivot positions of the first and second leg members 4 and 5 allows one leg member to fold under the other leg member within the space defined between the bottom surface of the side rails 30 and the bottom edge of the posts 35. As such, as shown in FIG. 3, the stand lies substantially flat in the folded position.

Figure 6:
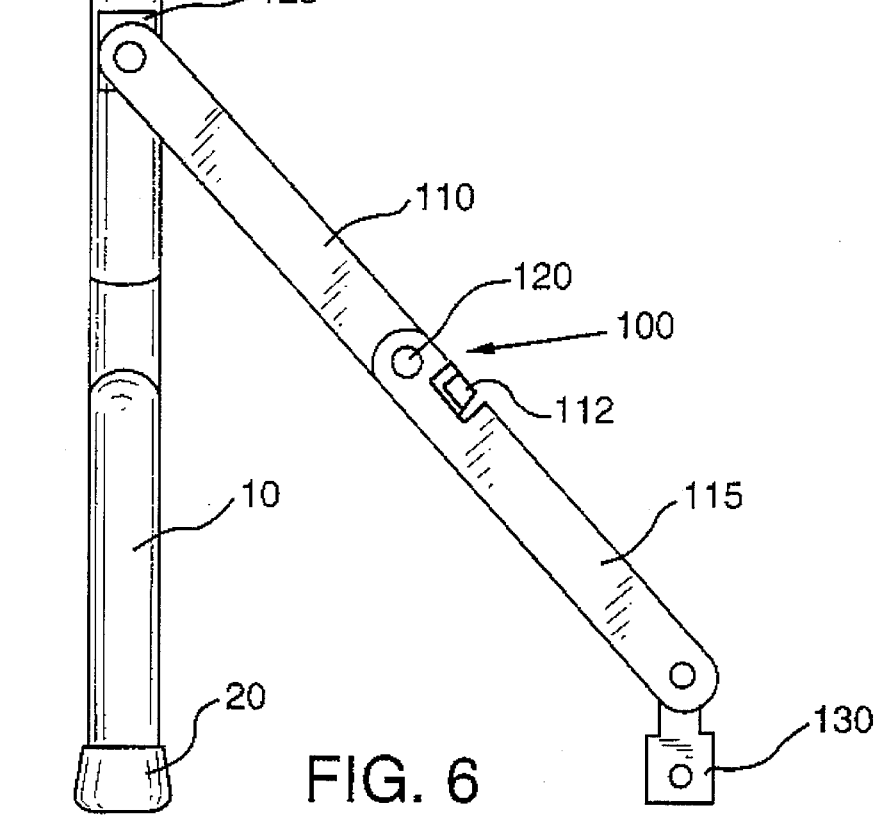
FIG. 6 a front elevational view of the first leg member and first hinged diagonal support member of the preferred embodiment of the present invention showing those members in isolation.
Figure 7:
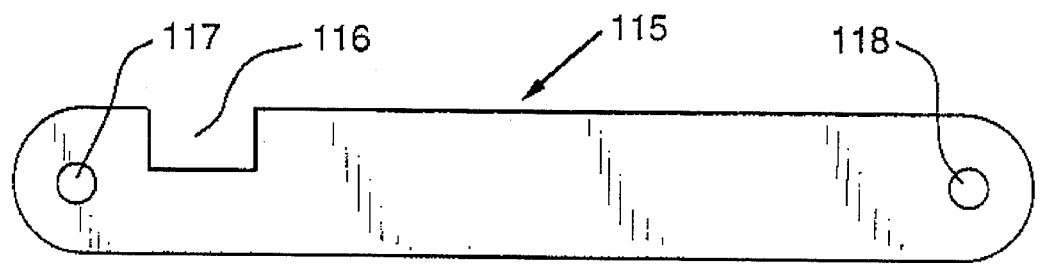
FIG. 7 is a front view of the second articulating member of the first hinged diagonal support member of the preferred embodiment of the present invention.
Figure 8:
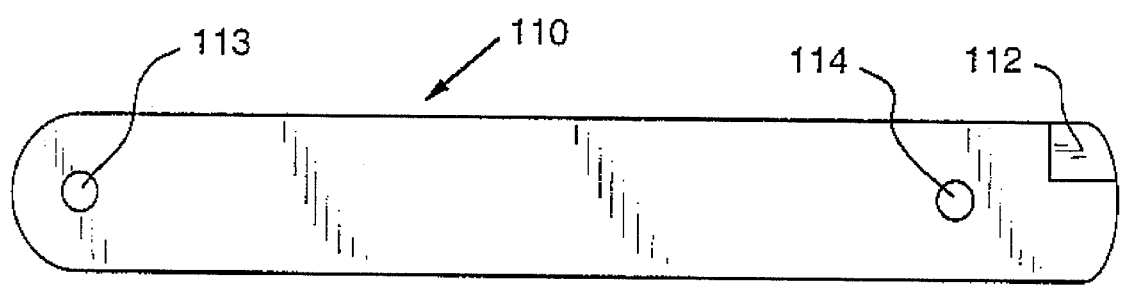
FIG. 8 is a front view of the first articulating member of the first hinged diagonal support member of the preferred embodiment of the present invention.
Figure 9:
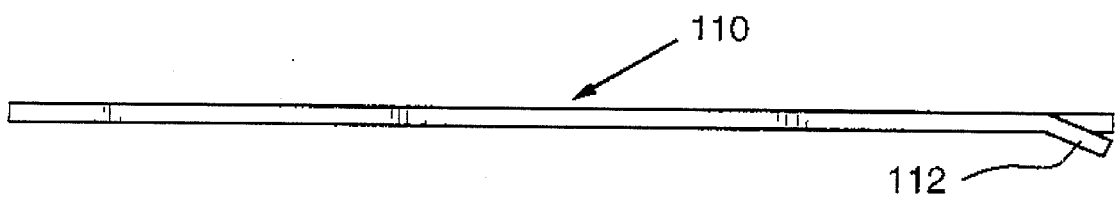
FIG. 9 is an on-end view of the first articulating member of the first hinged diagonal support member of the preferred embodiment of the present invention.

The stand of the present invention also includes first and second hinged diagonal support members 100 and 105, respectively, which provide support for leg members 4 and 5 and which are specially configured to allow the stand to fold into the substantially flat configuration shown in FIG. 3 and with minimum effort. As best shown in FIGS. 2 and 6, the first hinged diagonal support member 100 includes first and second articulating members 110 and 115, respectively. As shown in isolation in FIG. 7, second articulating member 115 includes first and second bores 117 and 118 at its first and second ends, respectively, and a cut away portion 116. As shown in isolation in FIG. 8 and on-end in FIG. 9, first articulating member 110 includes first and second bores 113 and 114 at its first and second ends, respectively, and is generally flat except for splayed portion 112 which protrudes slightly from the plane of the member. The articulating members 110 and 115 are pivotally connected by fastening member 120 disposed through bores 114 and 117. The articulating members are disposed such that when leg member 4 of the stand is pivoted to the open position shown in FIG. 2, splayed portion 112 of first articulating member 110 rotates into cut-away portion 116 of second articulating member 115 and prevents further rotation of the members around fastening member 120.

Figure 10A:
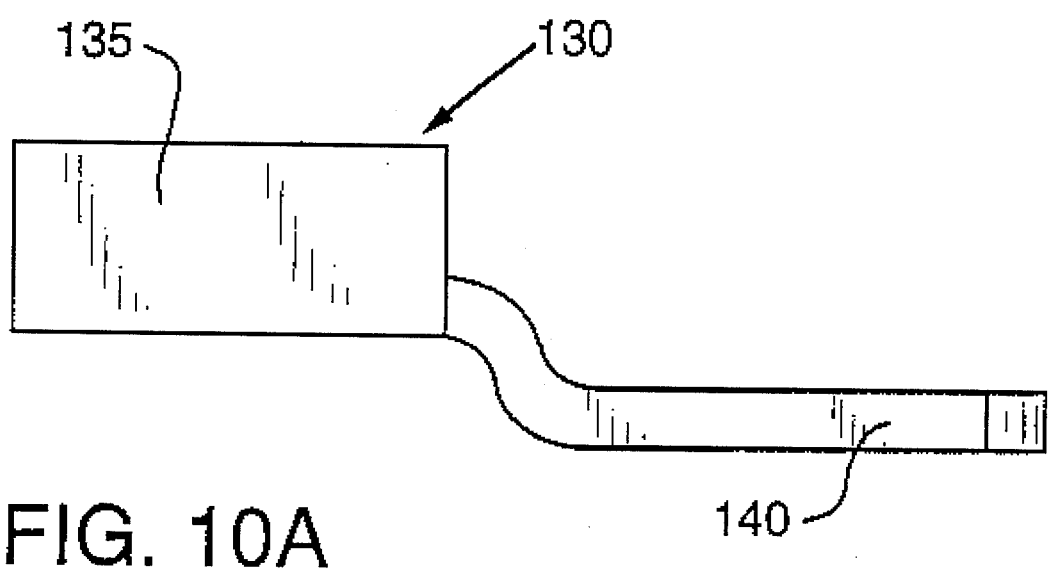
FIGS. 10A and 10B are top and side views, respectively, of a sliding bracket of the preferred embodiment of the present invention.
Figure 10B:
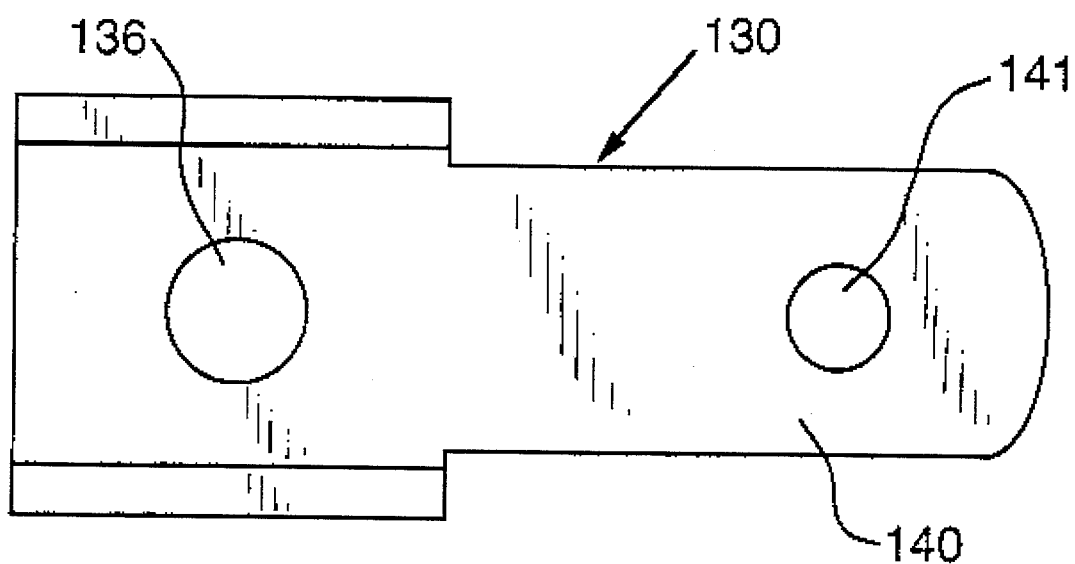

As shown in FIGS. 1 and 6, the first end of the first articulating member 110 is pivotally attached to leg bracket 125 which is, in turn, fixedly attached to the surface of second straight leg support 11 of leg member 4. The second end of the second articulating member 115 is attached to side rail 30 by sliding bracket 130, shown in isolation in FIGS. 10A and 10B, which includes a substantially U-shaped portion 135 having a bore 136 therethrough and a projecting lip 140 extending therefrom and having a bore 141 therethrough. The second end of second articulating member 115 is pivotally attached to sliding bracket 130 by a fastening member disposed through bore 118 in the second end of the second articulating member 115 and the bore 141 in projecting lip 140.

Each sliding bracket 130 is fixedly disposed on the side rail 30 by first passing a threaded bolt through the bore 136 in the U-shaped portion 135 of the sliding bracket 130, loosely threading a nut on the threaded bolt, and sliding the nut into the outer open track 75 of the side rail 30 such that the U-shaped profile of U-shaped portion 135 flanks the longitudinal edges of the open track 75. As with the fixation of each post 35 on the open track 75, the sliding bracket 130 is fixed in position along the side rail 30 by tightening the bolt disposed through the bore 136 in U-shaped portion 135 and thereby urging the nut attached thereto into contact with the interior wall of open track 75.

The first hinged diagonal support member 100 spans the distance between the sliding bracket 130, attached to side rail 30, and leg bracket 125 disposed on the second straight leg supports 11 of leg member 4. The first and second articulating members, 110 and 115, respectively, are configured, and the posts 35 and leg brackets 125 are positioned, such that when leg member 4 is pivoted from the unfolded position, shown in FIG. 2, to the folded position, shown in FIG. 3, the first hinged diagonal support member 100 folds with the leg member and does not to extend below the folded leg member 4 attached thereto when the stand is in the folded configuration.

Figure 11:
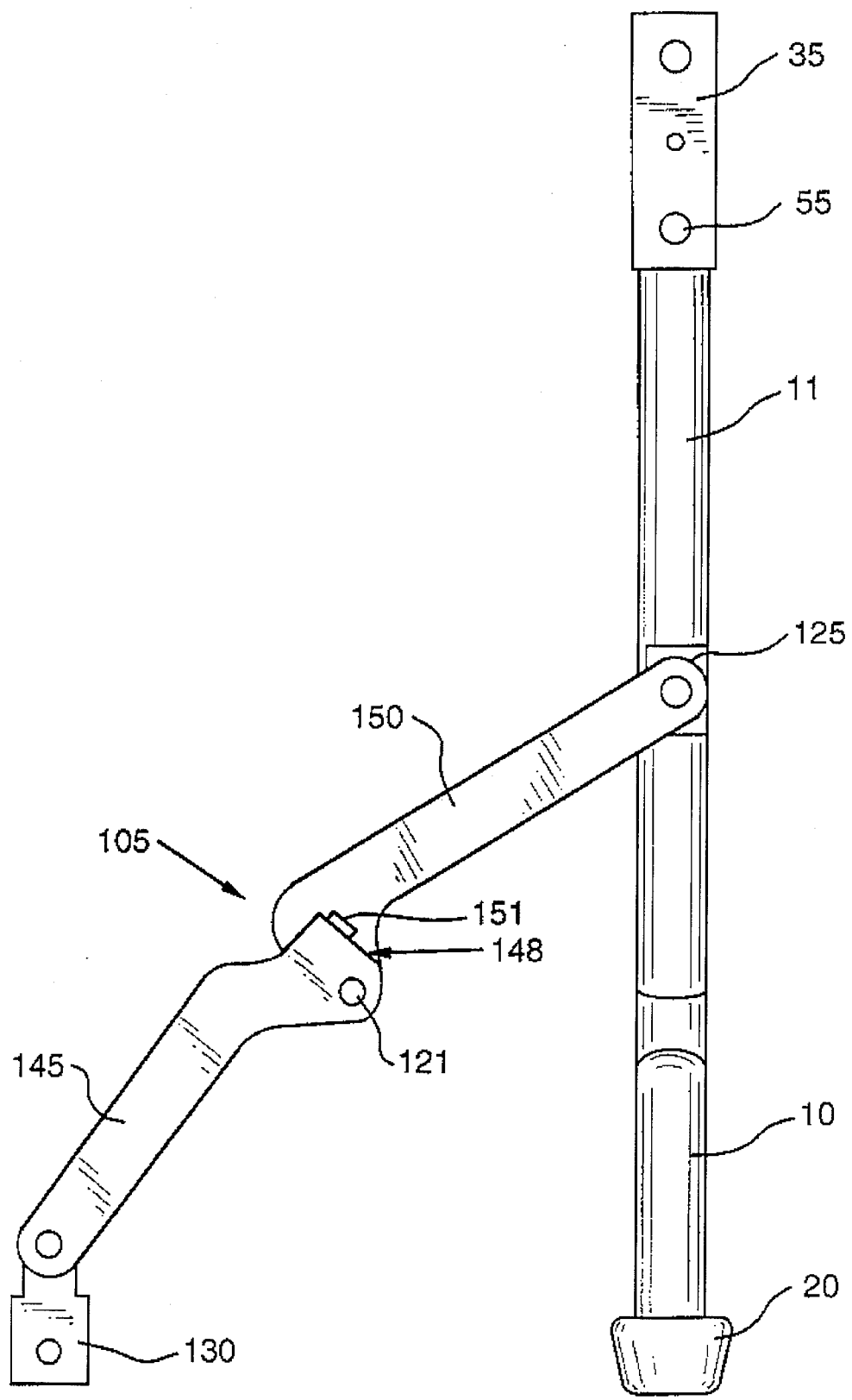
FIG. 11 is a front elevational view of the second leg member and second hinged diagonal support member of the preferred embodiment of the present invention showing those members in isolation.
Figure 12:
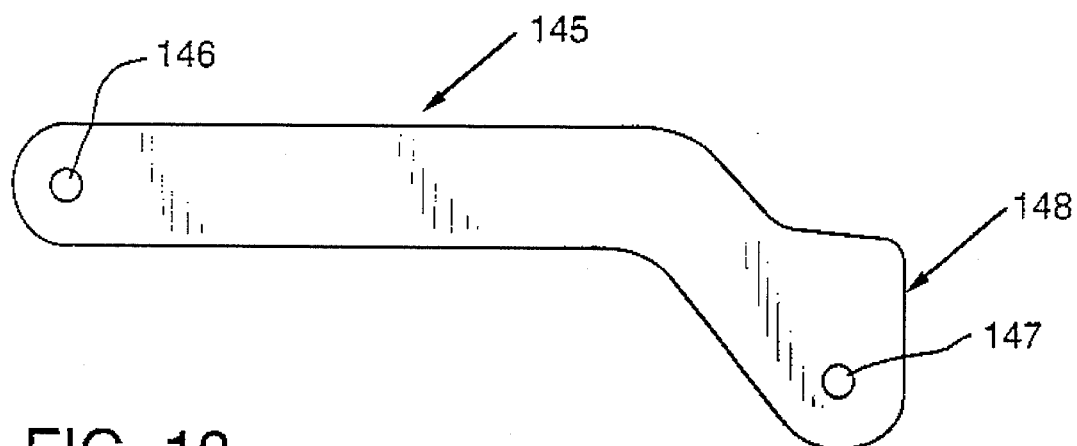
FIG. 12 is a front view of a first diagonal member of the second hinged diagonal support member of the preferred embodiment of the present invention.
Figure 13:
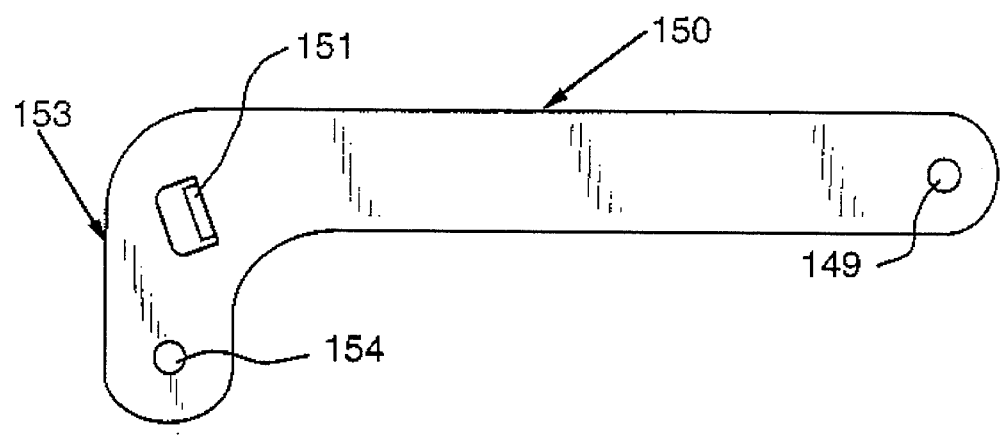
FIG. 13 is a front view of a second diagonal member of the second hinged diagonal support member of the preferred embodiment of the present invention.
Figure 14:
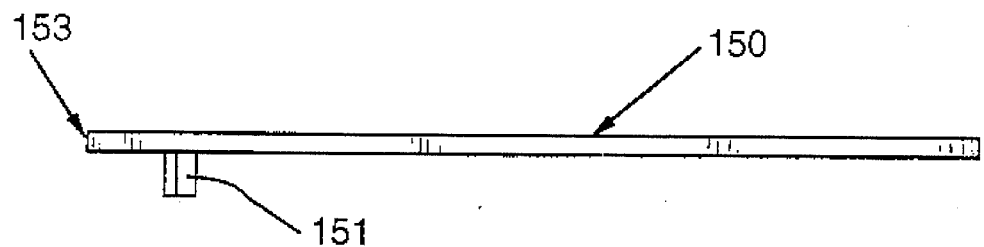
FIG. 14 is an on-end view of the second diagonal member of FIG. 15.

As shown in FIGS. 2 and 11, the second hinged diagonal support member 105 likewise includes first and second diagonal members 145 and 150, respectively. As shown in isolation in FIG. 12, first diagonal member 145 is a flat member having a club-shaped end, bores 146 and 147 at its first and second ends, respectively, and a flat face 148 at its second end. Second diagonal member 150, shown in isolation in FIG. 13 and on-end in FIG. 14, is generally J-shaped, has a flat surface 153, includes bores 154 and 149 at its first and second ends, respectively, and includes protruding flange 151 which is punched out and, as shown best in FIG. 14, extends normal to the plane of the second diagonal member 150. The second hinged diagonal support member 105 spans the distance between a sliding bracket 130 attached to side rail 30 and a leg bracket 125 attached at an intermediate point on the second straight leg supports 11 of the second leg member 5.

As shown in FIG. 11, the first and second diagonal members 145 and 150 are pivotally connected by fastening member 121 disposed through bores 147 and 154, the position of the bores creating a pivot position which is offset from the longitudinal axis of either diagonal member. Because of the offset pivot position, when the diagonal members are in the folded configuration shown in FIG. 3, the longitudinal axis of the second diagonal member 150 lies substantially parallel to the longitudinal axis of the leg member 5 to which it is pivotally attached through leg bracket 125. Also, when in the folded configuration the longitudinal axis of the first diagonal member 145 lies parallel to that of the side rail 30. As shown in FIG. 3, the offset position of the first and second diagonal members 145 and 150 when in the folded configuration creates a space therebetween providing clearance for the other folded leg member 4. Therefore, the offset pivot points of both leg members 4 and 5 and the offset pivot point of the first and second diagonal members of leg member 5 allow the stand to fold into a substantially flat configuration without interference from either folded leg member. No steps in addition to folding the leg members themselves are required to place the stand in the folded configuration.

As shown in FIG. 2 and 11, when the first and second diagonal members 145 and 150, respectively, are rotated in relation to one or other so that the stand is in the unfolded configuration, flange 151 contacts surface 148 and prevents further rotation of either diagonal member.

Figure 15:
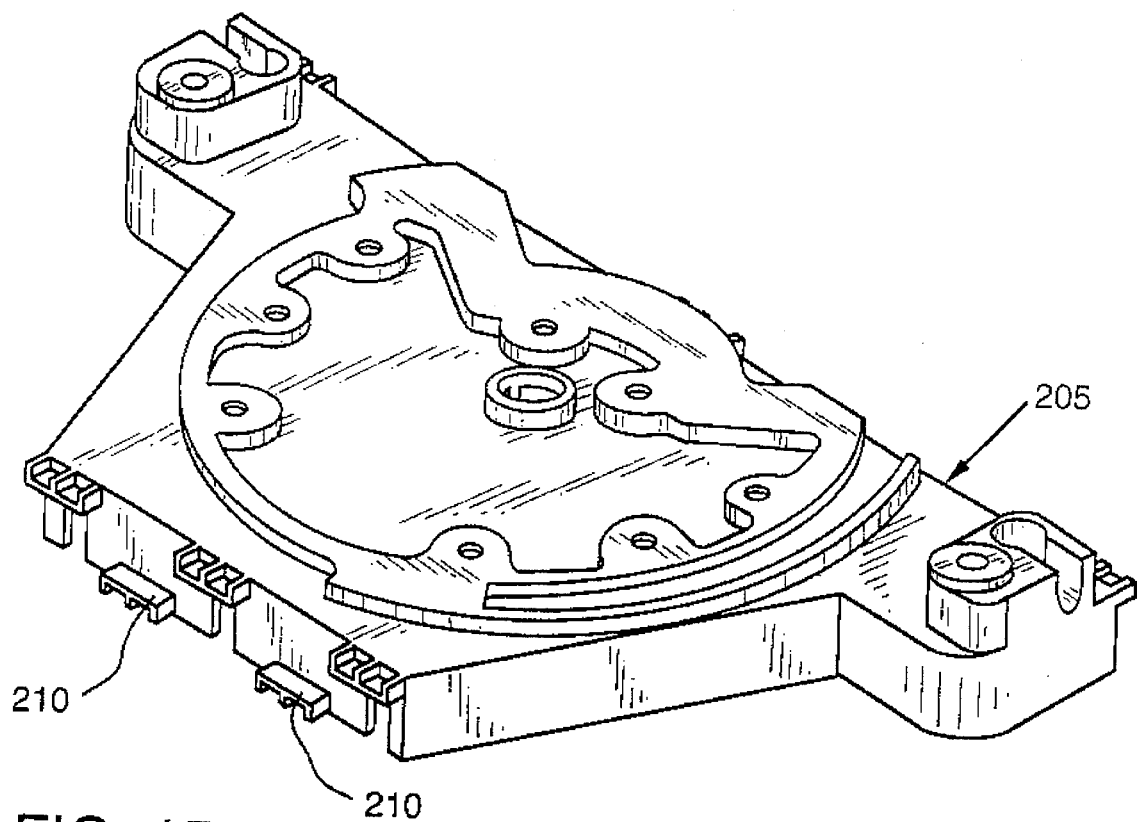
FIG. 15 is a perspective view of the base portion connected to the sliding compound miter saw of the preferred embodiment of the present invention.
Figure 16:
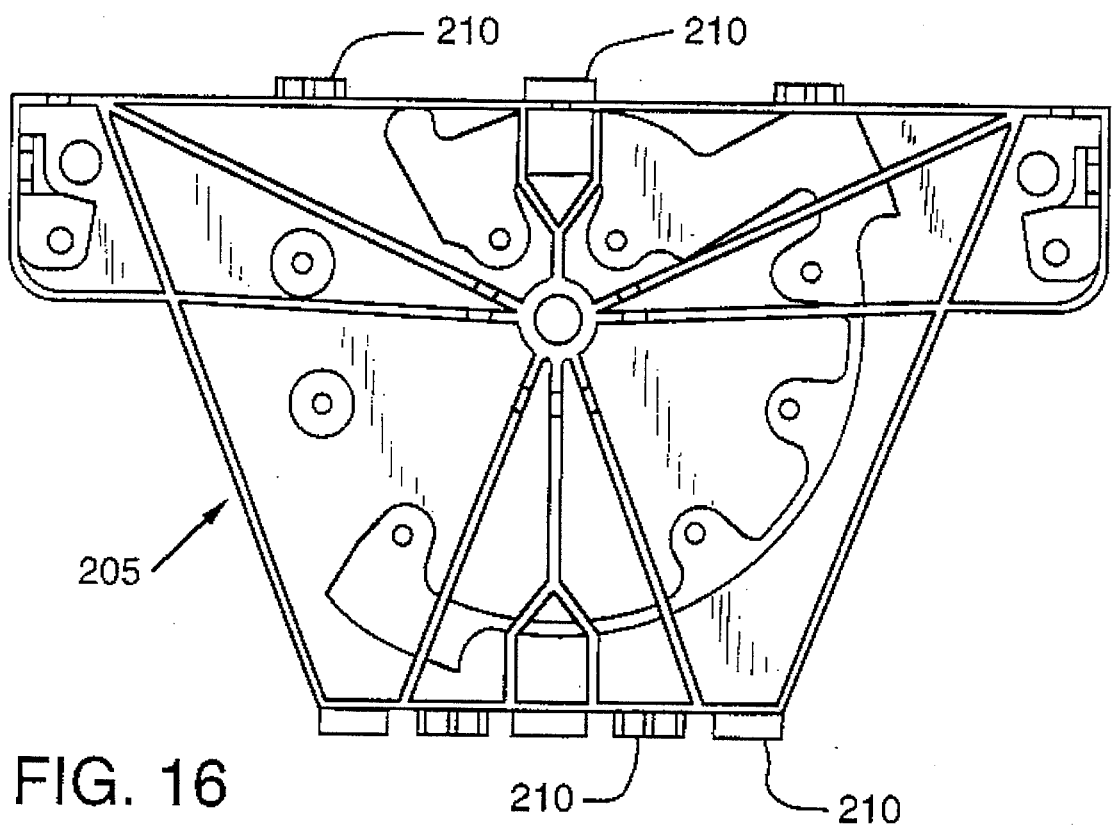
FIG. 16 is a bottom view of the base portion shown in FIG. 15.
Figure 17:
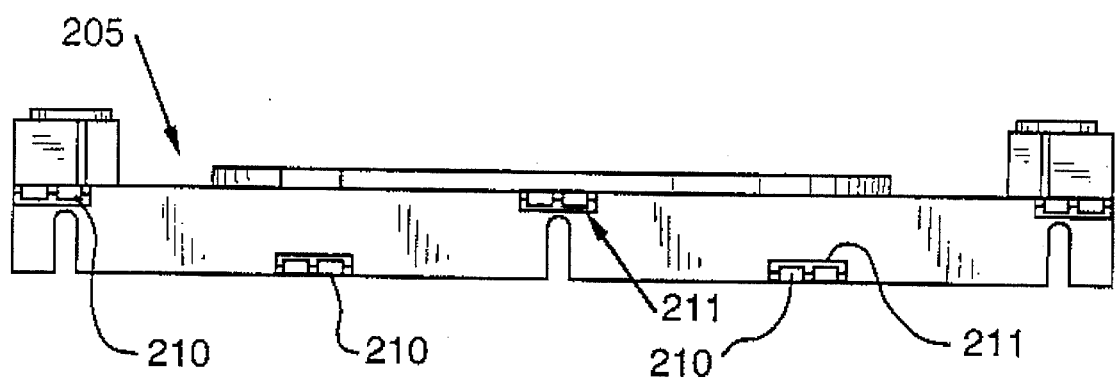
FIG. 17 is a rear elevational view of the base portion shown in FIG. 16.

The preferred configuration of the present invention also includes an arrangement for releasably connecting a piece of power machinery to side rails 30. As partially revealed in FIG. 1, a piece of power machinery 200 includes specially configured base portion 205 which may be connected to side rails 30. The base portion 205 is shown in several perspectives in FIGS. 15, 16 and 17 and is that of the sliding compound miter saw which is described in the co-pending application filed on even date herewith entitled "Adjustable Tool Table". However, it is contemplated that the base portion 205 as herein generally described may be incorporated on any piece of power machinery or other object as a means for connecting the machine or other object to the stand of the present invention. The base portion 205 includes projecting tabs 210 having an inward-facing flat surface 211 and which extend in a staggered arrangement from the back and front faces of the base portion 205.

In connecting base portion 205 to the stand of the present invention, base portion 205 is slid between the two opposed side rails 30. In sliding base portion 205 between opposed side rails 30, the projecting tabs 210 of base portion 205 are slid around the two opposed, inner open tracks 75 of opposed side rails 30. As shown in FIG. 4, the flat surfaces 211 of tabs 210 will oppose the top and bottom surfaces of the open tracks 75. Because the width of base portion 205, excluding the width of tabs 210, is approximately that between opposed side rails 30, the base portion 205 is held between the side rails 30 and the movement of base portion 205 toward the back or front of the stand is restricted. Because surfaces 211 of tabs 210 oppose the top and bottom surfaces of the opposed open tracks 75, the movement of base portion 205 in the vertical direction is also restricted.

The preferred configuration of the stand of the present invention also includes two retractable side extension assemblies 165 shown in FIG. 1. Each retractable side extension assembly 165 includes slide tubes 155 which are disposed at one end through an interference fit into side supports 160. The free ends of the slide tubes 155 of each side extension assembly 165 are then slidably received into the chambers 70 of side rails 30. A second side extension assembly may also be provided and is received into chambers 70 opening at the opposite end of side rails 30. Through the positioning of the twin chambers 70 in each side rail 30 and the distance between the slide tubes 155, one slide tube 155 of each side extension assembly 165 may be disposed into only one of the two rectilinear chamber 70 in each side rail 30. In this way, only one of the four slide tube 155 may be disposed in any one rectilinear chambers 70. By this staggered arrangement of the four slide tubes 155 in the four rectilinear chambers 70, no interference occurs between the two side extension assemblies 165 when they advance in and out of side rails 30.

To tighten the fit between the slide tube 155 as it slides within the rectilinear chamber 70, each rectilinear chamber 70 may include a slide bushing 170 configured to closely fit along the wall of rectilinear chamber 70 adjacent the open track 75. The surface of the slide bushing 170 projecting into the rectilinear chamber 70 is configured to conform to the outer surface of the slide tube 155.

Although the stand of the present invention has been described for use with a sliding compound miter saw having a base portion 205 as described above, it is anticipated that the stand may be used to releasably retain other machinery and other objects. Also, as noted above, the features described in terms of the preferred embodiment may be used in other elevated supports, for example, in elevated work tables in which a substantially flat or specially configured work surface is elevated at a desired level above the ground. In such other embodiments, it is contemplated that the above-described arrangement for attaching leg members to the side rails may be used to attach the leg members of the other embodiments to the work surface. In addition, it will be understood that the folding arrangement of the leg members described in terms of the preferred embodiment may be used in conjunction with any stand, whether or not such a stand includes an arrangement for releasably retaining objects. It is anticipated that those of ordinary skill in the art will conceive of many modifications and variations of the present invention. Such modifications and variations are intended to be covered by the foregoing specification and the following claims.

What is claimed:

1. A collapsible stand, comprising:

an object supporting portion having opposed ends and including an object-supporting surface for supporting an object;

first and second leg members;

a first pivotal connecting member for pivotally connecting said first leg member to an end of said object supporting portion to thereby define a first pivot axis, said first leg member pivotable about said first pivot axis between a folded position wherein said first leg member is substantially parallel with and adjacent to said object-supporting surface, and an unfolded position wherein said first leg member extends outwardly from said object-supporting portion;

a second pivotal connecting member for pivotally connecting said second leg member to said another end of said object-supporting portion to thereby define a second pivot axis, said second leg member pivotable about said second pivot axis between a folded position wherein said second leg member is substantially parallel with and adjacent to said first leg member when said first leg member is in its said folded position, and an unfolded position wherein said second leg member extends outwardly from said object-supporting portion, said second pivot axis disposed at a greater distance from said object-supporting surface than said first pivot axis, said first leg member disposed intermediate said object-supporting surface and said second leg member when said leg members are in their said folded positions; and at least first and second diagonal support members for maintaining said leg members in their said unfolded positions, said first diagonal support member connected at a first end to said first leg member and at a second end to said object-supporting portion, said second diagonal support member connected at a first end to said second leg member and at a second end to said object-supporting portion, said diagonal support members comprising first and second articulating members and being configured so as to collapse when said leg members are pivoted from their said folded position to their said unfolded position;

said first and second articulating members of said second diagonal support member being connected at a pivot axis offset from longitudinal axes of either of said articulating members to thereby provide an area between said first and second articulating members of said second diagonal support member when said second leg member is in its said folded position, said first leg member being disposed within said area when said leg members are in their said folded positions.

2. The collapsible stand of claim 1 wherein each of said leg members comprises two straight leg supports and each of said pivotal connecting members comprises two post members, a first end of each of said straight leg supports pivotally attached to one of said post members.

3. The collapsible stand of claim 2 wherein each of said post members comprises first and second coupling plates, said first coupling plate disposed at a distance from and substantially parallel to said second coupling plate to define a coupling space therebetween, said first end of each of said straight leg supports being pivotally connected to said posts within said coupling space.

4. The collapsible stand of claim 3 wherein at least one of said first and second coupling plates of each of said post members extends beyond said object-supporting portion, the stand being supported on said bottom surfaces of said post members when said first and second leg members are in their said folded positions.

5. The collapsible stand of claim 4 wherein said object-supporting portion comprises first and second side rails and wherein said post members and said second ends of said diagonal support members are connected to said side rails.

6. The collapsible stand of claim 5 wherein each of said side rails comprises:

two identical continuous chambers connected at a common side, the top and bottom surfaces of said chambers defining top and bottom surfaces of said side rails;

two identical continuous first channels, one of said first channels disposed on a side of each of said chambers opposed to said common side, said first channels thereby defining first and second side surfaces of said side rails and two identical continuous second channels dispose on said top and bottom surfaces of said side rails;

said first and second side rails disposed substantially parallel so that two of said first channels are opposed, a gap being provided between said first and second side rails.

7. The collapsible stand of claim 6 wherein each of said posts further comprises:

a weight-bearing portion including a flange thereon and being disposed substantially perpendicular to and connecting said coupling plates, said flange configured so as to be received and slide within said second channels; and an attachment portion including a generally J-shaped plate having a bore therethrough and extending upwardly from said weight bearing portion;

said post members connected to said side rails by slidingly retaining said J-shaped plate over said first channel by disposing a fastening member through said bore in said J-shaped plate and retaining said fastening member in said first channel, and disposing said flange of said weight-bearing portion in said second channel of said bottom surface of said side rail, said posts thereby being slidable along said side rail and fixedly attachable at any point along said side rail by tightening said fastening member so as to clamp said J-shaped plate against said open track.

8. The collapsible stand of claim 7, further comprising one or more side extension assemblies, each of said side extension assemblies comprising first and second slide tubes which are configured and spaced apart so as to be received by and slidable within two of said continuous chambers of said side rails.

9. The collapsible stand of claim 8, further comprising a pair of said side extension assemblies, said slide tubes of each of said side extension assemblies spaced apart so that said first slide tube is received by and slidable within said continuous chambers adjacent said first channel of said first side rail and said second slide tube is received by said continuous chamber adjacent said second channel of said second side rail.

10. The collapsible stand of claim 6, further comprising an object which includes a base portion having means for releasably connecting said object to said side rails.

11. The collapsible stand of claim 10 wherein said base portion includes substantially parallel front and back surfaces, each of said surfaces including opposed tab members defining a second space, said base portion releasably connected to said side rails by sliding said base portion onto said side rails such that said opposed tabs flank the top and bottom surfaces of said second channels and retain said object between said second channels.

12. The collapsible stand of claim 11, further comprising a pair of said side extension assemblies, each side extension assembly comprising first and a second slide tubes spaced apart so that said first slide tube is received by and slidable within said continuous chambers adjacent said first channel of said first side rail and said second slide tube is received by said continuous chamber adjacent said second channel of said second side rail.

13. The collapsible stand of claim 12 wherein said object is an item of powered machinery.

14. The collapsible stand of claim 13 wherein said item of powered machinery is a miter saw.

* * * * *